United States Patent

Hakluytt

[11] 4,199,935
[45] Apr. 29, 1980

[54] COMBUSTION APPARATUS

[75] Inventor: John P. D. Hakluytt, Botley, Near Southampton, England

[73] Assignee: The Secretary of State for Defence in Her Britannic Majesty's Government of the United Kingdom of Great Britain and Northern Ireland, London, England

[21] Appl. No.: 636,058

[22] Filed: Nov. 28, 1975

[51] Int. Cl.² .................. F02C 1/00; F02G 3/00
[52] U.S. Cl. ........................... 60/734; 431/352
[58] Field of Search ............... 431/350, 352; 60/39.65

[56] References Cited

U.S. PATENT DOCUMENTS

| | | | |
|---|---|---|---|
| 2,930,192 | 3/1960 | Johnson | 60/39.65 |
| 2,974,485 | 3/1961 | Schiefer | 60/39.65 |
| 3,352,106 | 11/1967 | Pianko | 60/39.65 |
| 3,671,171 | 1/1972 | Doyle | 431/352 X |

FOREIGN PATENT DOCUMENTS

| | | | |
|---|---|---|---|
| Ad.2482 | 2/1904 | France | 60/39.65 |
| 45-39848 | 3/1970 | Japan | 60/39.65 |

*Primary Examiner*—Edgar W. Geoghegan
*Attorney, Agent, or Firm*—Kerkam, Stowell, Kondracki & Clarke

[57] ABSTRACT

A gas turbine combustor which may be of cylindrical or annular configuration has a concave inner surface at its upstream end, and means for directing combustion air along the concave surface towards the middle thereof so as to form a stable vortex pattern near the concave surface, the vortical flow being in an upstream direction in the region of the periphery of the concave surface. A fuel injector for directing fuel droplets into combustion air flowing over the surface may be located at the middle of the concave surface.

5 Claims, 2 Drawing Figures

COMBUSTION APPARATUS

The invention relates to combustion for the combustion of fuel in an airstream and particularly, though not exclusively, relates to combustion apparatus for use in aircraft gas turbine engines.

The present invention provides a novel form of combustion apparatus wherein a high rate of heat release without excessive local heating of the apparatus can be achieved over a range of operating conditions.

According to the present invention combustion apparatus for the combustion of fuel in an airstream comprises a combustion chamber having a concave inner surface at the upstream end thereof and means for directing combustion air along the concave surface towards the middle thereof so as to form a stable vortex pattern near the concave surface, the vortical flow being in an upstream direction in the region of the periphery of the concave surface wherein combustion of the fuel takes place substantially within the vortex pattern.

Preferably, where a liquid fuel is employed, the fuel is injected at the middle of the concave surface into the combustion air flowing over the concave surface.

Embodiments of the invention will now be described, by way of example only, with reference to the drawings accompanying the Provisional Specification of which:

Corresponding parts in the figures are indicated by the same reference numerals.

Figure 1:
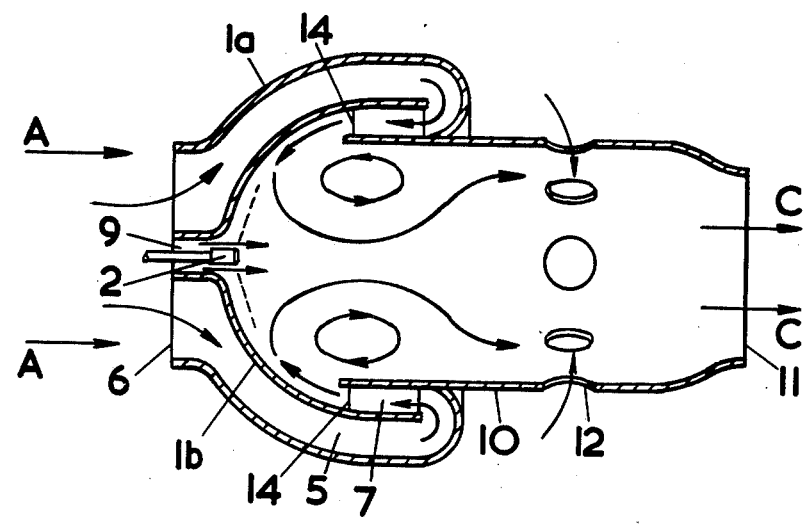
FIG. 1 is a sectional view of a combustion apparatus according to the invention.

The combustion apparatus of FIG. 1, which is the combustor of an aircraft gas turbine engine, is supported in an airstream flowing in a direction A shown in the drawing. The combustor has an annular diffuser duct 5 comprising a pair of coaxial diffuser casings 1a, 1b extending between an air inlet 6 and outlet 14 both facing upstream. The duct 5 has a return bend of annular configuration at its downstream termination. The casing 1b extends upstream of the outlet 14 to form a generally hemispherical surface over which air flows from the outlet 14 towards the middle of the surface. A series of circumferentially spaced vanes 7 located in the outlet portion of the duct 5 are inclined with respect to the longitudinal axis of the combustor and arranged so as to impart a swirling action to the air issuing from the outlet 14. A proportion of the combustion air is admitted into the combustor through an annular passage 9 defined between a tube portion forming the upstream termination of the casing 1b and a fuel injector 2 coaxially mounted within the tube portion. A flame tube 10, of smaller diameter than the diffuser duct 5, extends downstream of the duct and terminates in a nozzle 11 from which hot gas issues to a turbine (not shown). Circumferentially spaced holes 12 in the tube 10 admit dilution air into the combustor.

Figure 2:
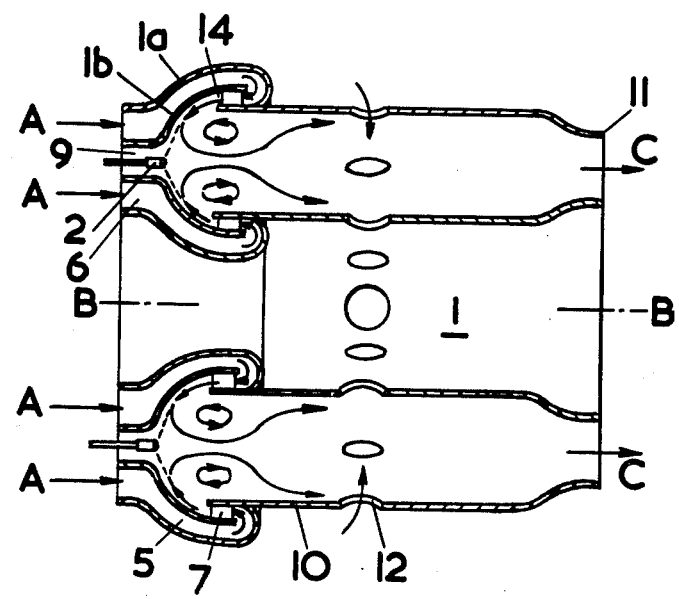
FIG. 2 is a similar view of a further embodiment of the invention.

The combustor shown in FIG. 2 is generally similar to that shown in FIG. 1, but has a diffuser casing 1 and flame tube 10 which together form an annular member extending around the longitudinal axis B—B. The combustor has a series of circumferentially spaced fuel injectors 2.

The operation of combustors according to the invention will now be described with reference to the drawings. Air from the airstream flowing in the direction A shown in the drawings is admitted as combustion air into the inlet 6 of the diffuser duct 5 and flows through the return bend in the duct to issue from the outlet 14 onto the hemispherical surface 1b with a swirling action imparted to the flow by the vanes 7. A spray of fuel droplets (shown dotted) is directed into the air issuing from the outlet 14 by the injector 2 and a stable toroidal flow system is set up within the combustor providing a flow reversal zone in which combustion of the fuel can take place. In the embodiment of FIG. 1, a flow pattern having single toroid is set up whereas in that of FIG. 2 a pair of concentric contra rotating toroids are present. A proportion of combustion air is admitted through the passage 9 around the fuel injectors 2 and flows into the primary combustion zone in the axial direction A and assists the formation and maintenance of the toroidal flow systems. By altering the ratio of the volume flow of air through the passage 9 to that through the duct 5 the performance of the combustor can be varied.

Some improvement in air flow quality through the return bend in the duct 5 may be obtained by including further vanes in the duct at, or upstream of the bend to impart swirl to the air flowing around the bend.

The air flowing through the duct 5 cools the casing 1b. Since substantially the whole of the combustion air passes through the combustion zone the detailed design of combustion apparatus according to the invention is simplified and more effective control of the combustion process is possible.

Where the air flowing in the duct 5 has a swirl component of flow added, dilution air having a swirl component in the opposite direction may assist mixing and the development of a uniform temperature profile in the gases issuing from the nozzle 11.

I claim:

1. Combustion apparatus for the combustion of fuel in an airstream which comprises a combustion chamber having a concave inner surface at the upstream end thereof, means associated with said concave surface for directing combustion air over the entire periphery of said surface towards the middle of the surface so as to form a stable vortex pattern near said surface, and means for injecting fuel from the middle of the surface into the air flowing in generally the opposite direction thereto along said surface towards the middle thereof, wherein vortical flow within the vortex is in an upstream direction in the region of the periphery of the concave surface and wherein combustion of the fuel takes place substantially within the vortex pattern.

2. The apparatus of claim 1 in which said chamber has a generally cylindrical configuration.

3. The apparatus of claim 2 in which said chamber has an annular configuration.

4. The apparatus of claim 1 wherein said means for directing combustion air along said concave surface also imparts to said air a swirl velocity component about the axis of the chamber.

5. The apparatus of claim 1 wherein said means for directing combustion air along said concave surface comprises a plurality of vanes, said vanes being circumferentially spaced around the axis of the chamber and inclined with respect to said axis so as to impart to the air a swirl velocity component about said axis.

* * * * *